United States Patent [19]

Kepple et al.

[11] 3,851,546
[45] Dec. 3, 1974

[54] TRANSMISSION

[75] Inventors: Richard K. Kepple, Huron; Claude A. Smith, Sandusky, both of Ohio

[73] Assignee: General Motors Corporation, Detroit, Mich.

[22] Filed: May 14, 1973

[21] Appl. No.: 360,365

[52] U.S. Cl............... 74/785, 74/863, 192/85 AA, 188/59
[51] Int. Cl. ... F16h 57/10, F16h 3/44, F16d 19/00, B61k 13/00
[58] Field of Search........ 74/785, 768, 863; 188/59; 192/85 AA

[56] References Cited
UNITED STATES PATENTS

| 2,064,646 | 12/1936 | Baule | 74/785 |
|---|---|---|---|
| 2,659,249 | 11/1953 | Carr | 74/785 |
| 2,820,529 | 1/1958 | Tack | 188/59 |
| 2,938,403 | 5/1960 | Harrison et al. | 74/863 |
| 3,077,124 | 2/1963 | Juenke | 74/785 |
| 3,082,647 | 3/1963 | Banker | 74/785 |
| 3,260,331 | 7/1966 | Borman, Jr. | 74/785 |
| 3,314,308 | 4/1967 | Ziegler | 74/785 |
| 3,782,516 | 1/1974 | Frisby et al. | 192/85 AA X |

FOREIGN PATENTS OR APPLICATIONS

| 1,912,285 | 9/1970 | Germany | 188/59 |

*Primary Examiner*—Samuel Scott
*Assistant Examiner*—P. S. Lall
*Attorney, Agent, or Firm*—John P. Moran

[57] ABSTRACT

A two-speed vehicular accessory drive mechanism including an input pulley, an output shaft, a planetary unit having its sun member connected to the output shaft and its carrier driven by the input pulley, vacuum-responsive means for holding the outer ring member of the planetary unit stationary at low engine speeds to thus cause the output shaft to be driven at an increased speed ratio, and a one-way clutch arrangement between the input pulley and the output shaft to drive the latter at input speed upon the freeing of the ring member by the vacuum-responsive means in response to change in vacuum reflective of a predetermined higher engine speed.

3 Claims, 4 Drawing Figures

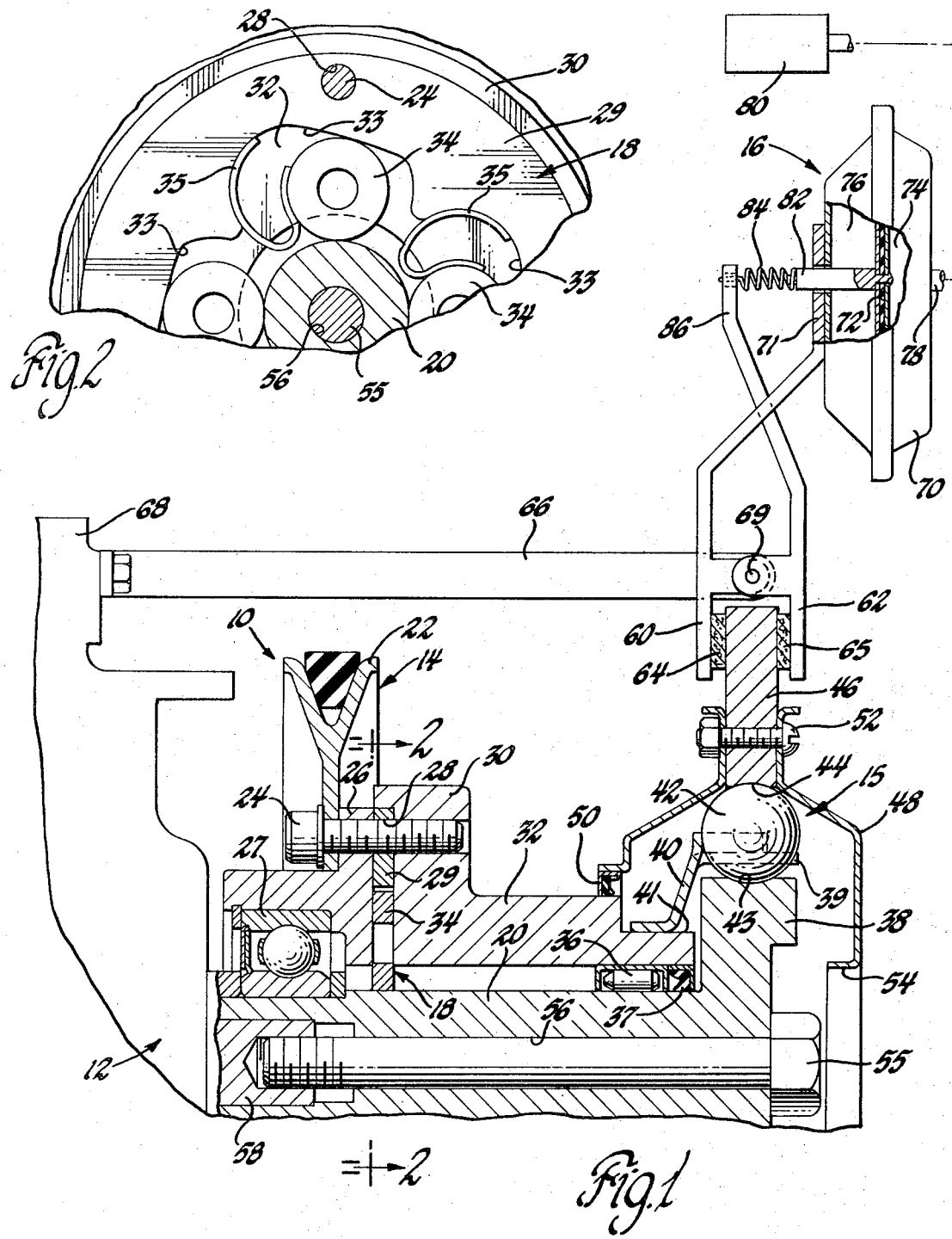

TRANSMISSION

This invention relates generally to transmissions and, more particularly, to two-speed vehicular accessory drive transmissions.

This invention provides an improved transmission for driving vehicular accessories at two different speed ratios with respect to engine speed or other selected parameters. For example, it may be desirable to increase the speed of a vehicular accessory, such as an engine cooling fan or an air injection pump, at low engine speeds, and then, at a predetermined higher engine speed, to drive the accessory at a 1:1 speed ratio with respect to input speed.

Accordingly, an object of the invention is to provide improved means for operating various vehicular accessories at two different speed ratios with respect to the engine speed.

Another object of the invention is to provide a two-speed accessory drive mechanism wherein a predetermined higher speed ratio is attained by the securing of the outer ring member of a planetary unit against rotation by vacuum-actuating means responding to a low engine speed signal, with the input mechanism driving the carrier, and the sun member being secured to or formed integrally on an output member. A lower speed ratio is established by a one-way clutch once the outer ring member is freed in response to a vacuum signal reflecting a predetermined higher engine speed.

A further object of the invention is to provide such a two-speed accessory drive mechanism wherein the vacuum-actuating means includes a diaphragm assembly, a reaction friction shoe mounted adjacent a face of the outer ring member, a second friction shoe movably mounted adjacent the other face of the outer ring member, pivotable lever means for actuating the movable friction shoe in response to movement of the diaphragm, and resilient means between the diaphragm and the pivotable lever means for permitting the diaphragm to move farther than the lever means while the latter is causing the second shoe to frictionally engage the ring member.

These and other objects and advantages of the invention will be apparent when reference is made to the following description and detailed drawings, wherein:

FIG. 1 is a fragmentary cross-sectional view of an accessory drive mechanism embodying the invention;

FIG. 2 is a fragmentary cross-sectional view taken along the plane of line 2—2 of FIG. 1, and looking in the direction of the arrows;

Figure 3:
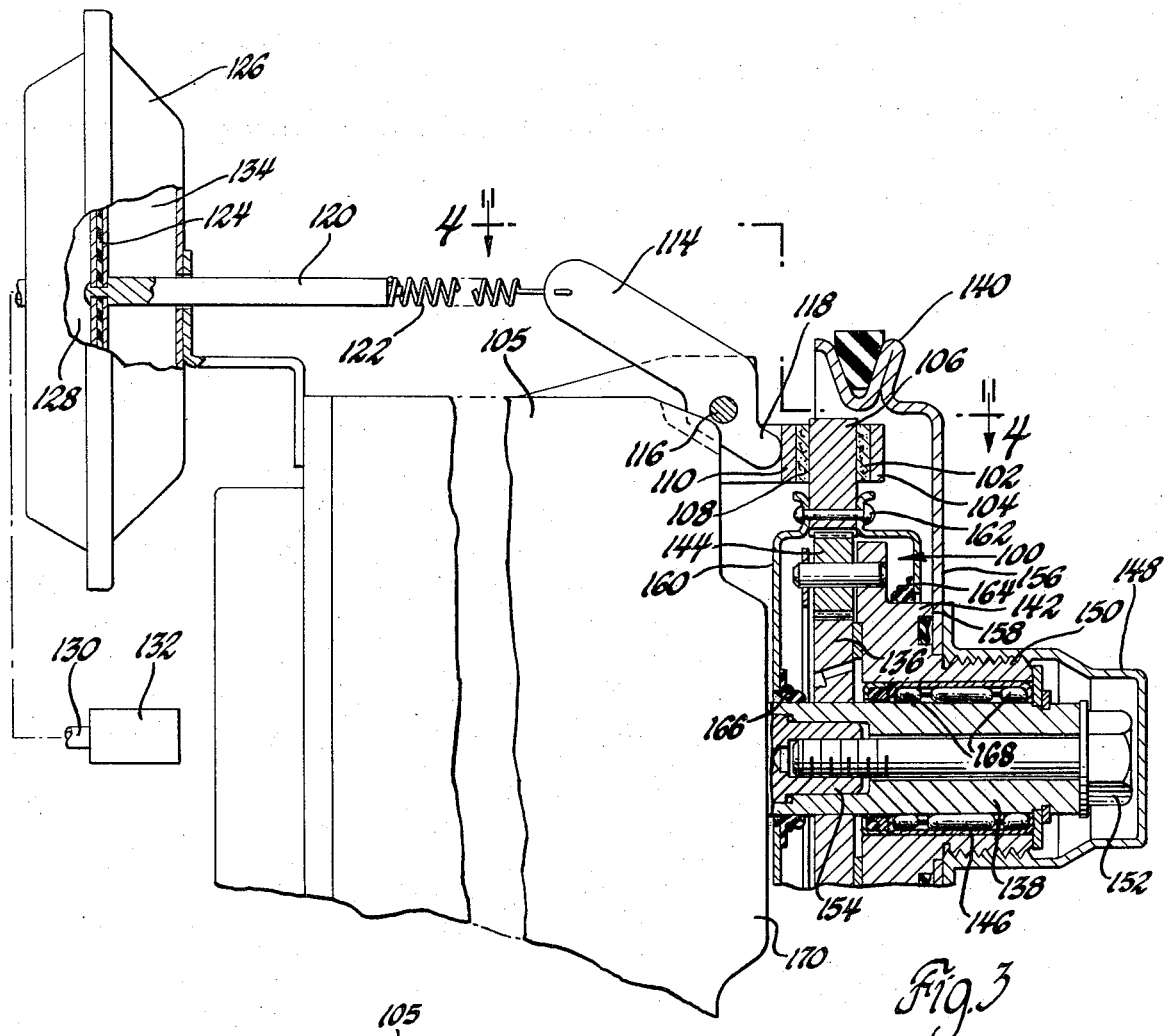
FIG. 3 is a fragmentary cross-sectional view of an alternate embodiment of the invention.

Referring now to the drawings in greater detail, FIG. 1 illustrates a two-speed accessory drive mechanism 10 drivingly connected to a predetermined vehicular accessory, such as an air injection pump, and represented generally at 12. The drive mechanism 10 includes an input pulley assembly 14, a ball-traction planetary unit 15, a vacuum-responsive actuating mechanism 16, a one-way clutch 18, and an output shaft 20.

More specifically, the input pulley assembly 14 includes a belt-driven pulley 22 secured by bolts 24 to a hub member 26 rotatably mounted by bearings 27 on the output shaft 20. The bolts 24 also extend through openings 28 formed in a ring 29 and are threadedly connected to a flange 30 of a planetary carrier hub member 32. A plurality of inner eccentric surfaces 33 are formed on the ring 29 which, along with cooperating rollers 34 (FIG. 2) and substantially U-shaped springs 35 constitute the one-way clutch 18 located around the output shaft 20 and intermediateadjacent faces of the pulley hub member 26 and the flange 30. Such an overrunning or one-way clutch is disclosed and described in U.S. Pat. No. 2,699,238 Sampatacos, et al, dated Jan. 11, 1955.

Suitable needle bearings 36 and a seal 37 are rotatably mounted between the inner surface of the carrier hub member 32 and the outer surface of the output shaft 20

A sun member 38 of the planetary unit 15 is formed on an end-portion of the output shaft 20. A plurality of pockets 39 are formed in a stamped separator member 40 mounted on hexagonally shaped or other noncircular end-portion 41 of the carrier hub member 32. Ball planets 42 are mounted in the respective pockets 39 are confined radially between oppositely disposed annular grooved surfaces 43 and 44 formed respectively in the sun member 38 and a ring member 46.

A two-piece housing 48 surrounds the planetary unit 15, separated from the outer surface of the carrier hub member 32 by a suitable seal 50. The two-piece housing 48 is secured to opposite faces of the ring member 46 by bolts 52.

An opening 54, formed in the outer end-portion of the housing 48, permits the insertion therethrough of a bolt 55 for extension through an axial opening 56 formed in the output shaft 20 to secure the latter to an input shaft or member 58 of the vehicular accessory 12.

The vacuum-responsive actuating mechanism 16 includes a pair of oppositely disposed braking members 60 and 62, having respective friction material shoes 64 and 65 mounted thereon adjacent the opposite faces of the ring member 46. The braking members 60 and 62 are supported by a suitable brace or bracket 66 secured to the fixed housing 68 of the accessory 12. The braking members 60 and 62 are pivotally mounted on a pivot pin 69 extending through the bracket 66. Intermediate portions of the braking members 60 and 62 cross each other in scissors-like fashion. A diaphragm housing 70 is mounted on the end-portion 71 of the braking member 60, on the end thereof opposite the shoe 64. A diaphragm 72, secured at its outer peripheral edge in the housing 70, serves as a movable wall between the chambers 74 and 76 formed within the housing 70 and is responsive to changes in vacuum communicated to the chamber 74 via a line 78 leading from a suitably controlled vacuum source, represented at 80. A stem 82 extends from the center of the diaphragm 72, across the chamber 76 and through an opening in the wall of the housing 70. A spring 84 connects between the end of the stem 82 and an end-portion 86 of the pivotally mounted braking member 62. The spring 84 permits the diaphragm 72 to move through the chamber 74 to the wall to the housing 70, if necessary, while the shoe 65 is moved only a short distance to frictionally engage the ring member 46.

OPERATION

In operation, at low engine speeds, vacuum, supplied from the vacuum source 80 via the line 78 to the chamber 74 permits the atmospheric pressure in the chamber 76 to move the diaphragm 72 to the right in FIG. 1, pulling the spring 84 and the end-portion 86 of the braking member 62 to the right, thereby pivoting the shoe 65 into frictional contact with the ring member 46. With the shoe 64 of the braking member 60 serving as a reaction member, the ring member 46 is frictionally engaged and thus held stationary.

The ball planets 42 are thereupon caused to "walk around" the annular grooved surface 44 of the ring member 46 by the separator member 40, the carrier hub member 32, the flange 30, the pulley hub 26, and the belt-driven pulley 22. Frictional contact of the ball planets 42 with the annular grooved surface 43 of the sun member 38 thus causes the latter, as well as the output shaft 20 on which it is integrally formed, to rotate at some predetermined multiple of input speed, say, two and one-half (2½) times in a typical design, to drive the vehicular accessory 12 accordingly.

At some higher predetermined engine speed and a corresponding change in vacuum, pressure in the chamber 74 will approach the atmospheric pressure in the chamber 76 to the point where the diaphragm 72 will move leftward in FIG. 1, pivoting the braking member 62 about the pivot pin 69 to release the shoe 65 from the ring member 46. Once the speed of the sun member 38 reduces to that of the input pulley 22, the one-way clutch 18 becomes effective to cause the sun member 38 and the accessory 12 to thereafter travel in a direct drive relationship with the input pulley 22 in the usual manner.

Figure 4:
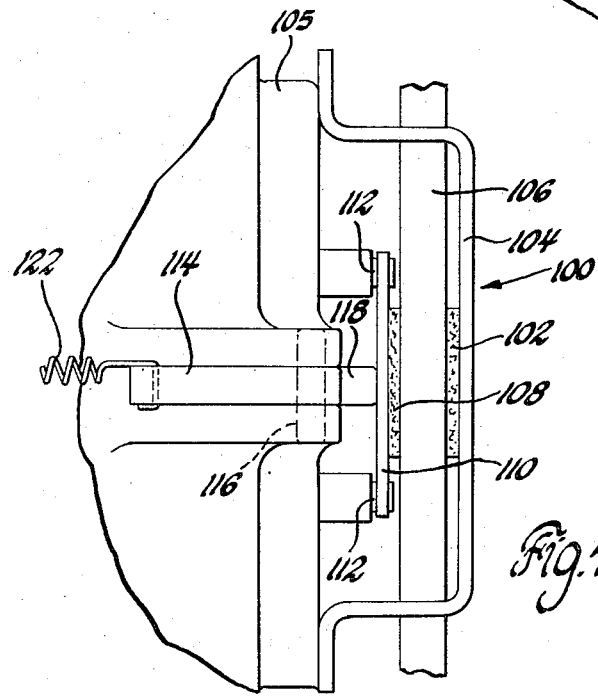
FIG. 4 is a top view taken along the plane of line 4—4 of FIG. 3, and looking in the direction of the arrows.

FIGS. 3 and 4 illustrate an alternate embodiment, similar in function to the FIG. 1 embodiment, but having a different physical arrangement and including a gear-type planetary unit 100 in lieu of the ball-traction planetary unit 15 of the FIG. 1 structure.

A reaction shoe 102 is secured via a bracket 104 to the accessory housing 105 so as to be permanently positioned adjacent a face of the ring gear 106, while an oppositely disposed shoe 108 is secured to a flat plate member 110 slidably mounted on pins 112 formed on the accessory housing 105 and movably positioned adjacent the opposite face of the ring gear 106. An actuator lever 114 is pivotally mounted on a pin 116 secured to the housing 105 such that a nose-portion 118 of the lever 114 is pivoted into and out of contact with the plate member 110 by the stem 120 and a spring 122 connection between the diaphragm 124 of the diaphragm housing 126 and the end of the lever 114 opposite the nose-portion 118, in response to changes in vacuum pressure communicated to the chamber 128 via a line 130 from a suitable vacuum source represented generally at 132.

As in the case of the FIG. 1 embodiment, a reduction in vacuum pressure in the chamber 128 permits atmospheric pressure in the opposite chamber 134 to move the diaphragm 124 to the left in FIG. 3, thereby pivoting the nose-portion 118 of the actuator lever 114 into contact with the flat plate member 110 and urging the shoe 108 into fractional engagement with the ring gear 106, to hold the latter stationary.

As a result of the ring gear 106 being held stationary, the rotational speed of the sun gear 136 and the output shaft 138 is thus increased to a predetermined multiple of the input pulley 140 speed due to the carrier 142 being driven directly by the input pulley 140, causing the planet gears 144 to "walk around" within the fixed ring gear 106, thus driving the sun gear 136 at an increased speed ratio.

Once the vacuum pressure in the chamber 128 changes to reflect a predetermined higher engine speed, the diaphragm 124 will move to the right, pivoting the actuator nose-portion 118 away from the flat plate member 110, thereby freeing the ring gear 106. The one-way clutch 146 will then become effective to drive the output shaft 138 at the same speed as that of the belt-driven input pulley 140.

A cover member 148 may be threadedly secured to a threaded extension 150 of the carrier 142 to both cover the output shaft 138 and the bolt 152 which secures the shaft 138 to an input shaft 154 extending from the accessory housing 105, and secure the flange 156 of the input pulley 140 against a sealed face 158 formed on the carrier 142. A planetary cover 160 may be secured by bolts or rivets 162 to the ring gear 106, with suitable seals 164 and 166 being mounted between the cover 160 and the carrier 142 and the output shaft 138, respectively. Bearings 168 are mounted within the carrier extension 150 to support the shaft 138, in lieu of the bearings 27 and 36 of the FIG. 1 structure.

Similar to the function of the spring 84, the spring 122 is utilized to permit the diaphragm 124 to move completely through the chamber 128 to the wall of the housing 126, in response to vacuum changes, while the nose-portion 118 of the actuator lever 114 and the shoe 108 move only a very short distance to contact the ring gear 106.

It should be apparent that the invention provides an improved, simplified and efficient means for driving vehicular accessory units at two speed ratios in response to vacuum signals reflecting engine speeds.

It should also be apparent that parameters other than speed, such as temperature, for example, may be the medium used as the control signal in conjunction with the operation of the vacuum source 80 or 132.

While but two embodiments of the invention have been shown and described, other modifications thereof are possible.

We claim:

1. For use with a vehicular engine, an accessory drive transmission comprising a belt-driven input pulley and an output shaft; a planetary drive unit including an output ring member, an input sun member, a plurality of planets operatively connected between said inner sun and outer ring members, and a carrier member for driving said planets; connector means surrounding said output shaft for connecting said carrier member to said input pulley for rotation therewith; a source of vacuum reflective of engine speed; a housing; a diaphragm serving as a movable wall to form first and second chambers in said housing; a line for communicating a vacuum signal from said source to said first chamber; a stem mounted on said diaphragm and extending axially through said second chamber and the wall of said housing; a reaction friction member secured adjacent one face of said outer ring member; a second friction member movably mounted adjacent the other face of said outer ring member; a lever member pivotally mounted adjacent said second friction member; a spring interconnecting said lever member and said stem for permitting said diaphragm to move through said first chamber to the wall of said housing while said second friction member moves only a short distance to frictionally engage said outer ring member; said second friction member being urged into contact with said other face of said outer ring member, thereby frictionally confining said outer ring member between said second friction member and said reaction friction member in response to pivotal movement by said lever member caused by axial movement of said diaphragm responsive to a vacuum signal indicative of engine speed below a predetermined value; and a one-way clutch mounted intermediate said carrier member and said output shaft for driving said output shaft directly upon disengagement of said second friction member from said other face of said outer ring member in response to vacuum signals indicative of engine speeds above said predetermined value.

2. For use with a vehicular engine, an accessory drive transmission comprising a belt-driven input pulley and an output shaft; a planetary traction-drive unit including an outer ring member, an inner sun member, a plurality of ball planets frictionally contacting said inner sun and outer ring members, and a carrier member for driving said ball planets; connector means surrounding said output shaft for connecting said carrier member to said input pulley for rotation therewith; a source of vacuum reflective of engine speed; a housing; a diaphragm serving as a movable wall to form first and second chambers in said housing; a line for communicating a vacuum signal from said source to said first chamber; a stem mounted on said diaphragm and extending axially through said second chamber and the wall of said housing; a reaction friction member secured adjacent one face of said outer ring member; a second friction member movably mounted adjacent the other face of said outer ring member; a lever member pivotally mounted adjacent said second friction member; a spring interconnecting said lever member and said stem for permitting said diaphragm to move through said first chamber to the wall of said housing while said second friction member moves only a short distance to frictionally engage said outer ring member; said second friction member being urged into contact with said other face of said outer ring member, thereby frictionally confining said outer ring member between said second member and said reaction friction member in response to pivotal movement by said lever member caused by axial movement of said diaphragm responsive to a vacuum signal indicative of engine speed below a predetermined value; and a one-way clutch mounted intermediate said carrier member and said output shaft for driving said output shaft directly upon disengagement of said second friction member from said other face of said outer ring member in response to vacuum signals indicative of engine speeds above said predetermined value.

3. For use with a vehicular engine, an accessory drive transmission comprising a belt-driven input pulley and an output shaft; a planetary gear unit including an outer ring gear, an inner sun gear, a plurality of planet gears intermeshed between said inner sun and outer ring gears, and a carrier member for driving said planet gears; connector means surrounding said output shaft for connecting said carrier member to said input pulley for rotation therewith; a source of vacuum reflective of engine speed; a housing; a diaphragm serving as a movable wall to form first and second chambers in said housing; a line for communicating a vacuum signal from said source to said first chamber; a stem mounted on said diaphragm and extending axially through said second chamber and the wall of said housing; a reaction friction member secured adjacent one face of said outer ring gear; a second friction member movably mounted adjacent the other face of said outer ring gear; a lever member pivotally mounted adjacent said second friction member; a spring interconnecting said lever member and said stem for permitting said diaphragm to move through said first chamber to the wall of said housing while said second friction member moves only a short distance to frictionally engage said outer ring member; said second friction member being urged into contact with said other face of said outer ring gear, thereby frictionally confining said outer ring gear between said second friction member and said reaction friction member in response to pivotal movement by said lever member caused by axial movement of said diaphragm responsive to a vacuum signal indicative of engine speed below a predetermined value; and a one-way clutch mounted intermediate said carrier member and said output shaft for driving said output shaft directly upon disengagement of said second friction member from said other face of said outer ring gear in response to vacuum signals indicative of engine speeds above said predetermined value.

* * * * *

UNITED STATES PATENT OFFICE
CERTIFICATE OF CORRECTION

Patent No. 3,851,546　　　　　　Dated December 3, 1974

Inventor(s) Richard K. Kepple and Claude A. Smith

It is certified that error appears in the above-identified patent and that said Letters Patent are hereby corrected as shown below:

Col. 2, line 21, "are" should read -- and --.

Col. 4, bridging lines 45-46, "output"

should read -- outer --;

line 46, "input" should read -- inner --.

Signed and sealed this 8th day of April 1975.

(SEAL)
Attest:

RUTH C. MASON
Attesting Officer

C. MARSHALL DANN
Commissioner of Patents
and Trademarks